(12) United States Patent
Li et al.

(10) Patent No.: US 10,913,094 B2
(45) Date of Patent: Feb. 9, 2021

(54) MULTI-UNIT ROTARY SYSTEM AND METHOD FOR STORAGE, INTELLIGENT SORTING AND PICKING OF EXPRESS PARCELS

(71) Applicant: Northeastern University, Shenyang (CN)

(72) Inventors: Hui Li, Shenyang (CN); Bangchun Wen, Shenyang (CN); Zhao hui Ren, Shenyang (CN); Jun an Chen, Shenyang (CN); He Li, Shenyang (CN); Wei Sun, Shenyang (CN); Qing kai Han, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 210 days.

(21) Appl. No.: 16/337,330

(22) PCT Filed: Sep. 27, 2016

(86) PCT No.: PCT/CN2016/100275
§ 371 (c)(1),
(2) Date: Mar. 27, 2019

(87) PCT Pub. No.: WO2018/058280
PCT Pub. Date: Apr. 5, 2018

(65) Prior Publication Data
US 2020/0009616 A1    Jan. 9, 2020

(51) Int. Cl.
*B07C 1/02* (2006.01)
*B07C 3/08* (2006.01)

(52) U.S. Cl.
CPC ............... *B07C 1/02* (2013.01); *B07C 3/08* (2013.01)

(58) Field of Classification Search
CPC .. B07C 1/02; B07C 1/045; B07C 3/02; B07C 3/08; B65G 47/901; B65G 47/46; B65G 1/045; B65G 1/1373; B25J 9/0042; B25J 18/025
USPC .......................................................... 209/3.1
See application file for complete search history.

(56) References Cited

FOREIGN PATENT DOCUMENTS

| CN | 204724474 U | 10/2015 |
|---|---|---|
| CN | 204980269 U | 1/2016 |
| CN | 105772404 A | 7/2016 |
| CN | 105809834 A * | 7/2016 |
| CN | 105809834 A | 7/2016 |

(Continued)

*Primary Examiner* — Terrell H Matthews
(74) *Attorney, Agent, or Firm* — Muncy, Geissler, Olds & Lowe, P.C.

(57) ABSTRACT

The present invention provides a multi-unit rotary system and method for storage, intelligent sorting and picking of express parcels. Through adoption of layered design of a rotary storage unit, different sizes of parcels are stored in a sorting manner, thereby effectively increasing the utilization rate of the storage space; besides, due to the storage design of the subunits, arrangement of storage units of the system is more flexible, and the number of rotary storage unit subunits can be set freely according to the requirements for site space and the storage capacity for express parcels; through adoption of overall unit combination design of the present invention, the mounting, the layout and the maintenance of the system are more convenient, and during the operation of the system, automatic sorting and storage of the express parcels are achieved.

10 Claims, 8 Drawing Sheets

(56) References Cited

FOREIGN PATENT DOCUMENTS

| CN | 105844812 A | * | 8/2016 | | |
|----|-------------|---|--------|---|---|
| CN | 105844812 A | | 8/2016 | | |
| CN | 205518665 U | | 8/2016 | | |
| CN | 105923365 A | | 9/2016 | | |
| EP | 2865456 A1 | | 4/2015 | | |
| WO | WO-2018058280 A1 | * | 4/2018 | ............ | B65G 47/46 |

* cited by examiner

MULTI-UNIT ROTARY SYSTEM AND METHOD FOR STORAGE, INTELLIGENT SORTING AND PICKING OF EXPRESS PARCELS

BACKGROUND OF THE INVENTION

1. Field of the Invention

The present invention relates generally to logistics equipment, and more particularly, to provide a multi-unit rotary system and method for storage, intelligent sorting and picking of express parcels.

2. The Prior Arts

Due to rapid development of China's economy and rapid spreading of E-commerce and online shopping, China's logistics and transportation industry has developed by leaps and bounds in recent years. However, China's current logistics and transportation industry still focuses on manual sorting and manual delivery, resulting in low automation degree and a series of problems of low sorting efficiency, high time cost, large labour demand and the like.

In recent years, with the decline of the total number of working-age population in China, China's labour resources are gradually shrinking, and the cost of labour resources in the logistics and transportation industry will be gradually increased in the future. How to increase the automation degree of the logistics and transportation industry has become a problem urgent to be solved in the industry.

Furthermore, the "Made in China 2025" issued by the State Council of the People's Republic of China has brought new opportunities for development of the intelligent logistics equipment industry. In the next few years, intelligent logistics technology and equipment that meet the needs of new "Intelligent Era" will be taken seriously. Supported by the national policy, intelligent logistics equipment will also usher in a new development peak, and its market prospects are very broad.

Although a conventional express parcel sorting system in the world is relatively mature, the scale is relatively large and generally applied to the centralized sorting of express parcels in transit freight stations. For the domestic market, with gradual rise of self-picking sites of the express parcels, people's demand for sorting and extraction systems for express parcels is becoming more and more urgent.

With the development of automation technologies in the express transportation industry, there are now some systems for sorting, storage and automatic picking of express parcels, such as an intelligent express parcel sending and picking system and application method thereof, disclosed by CN105844812A and a self-service express parcel cabinet and an express parcel delivering and mailing method thereof, disclosed by CN105809834A proposed by Hunan University. The two systems, however, just make certain innovations in a conventional self-service storing and picking process of express parcels, but do not involve the sorting process of express parcels. In addition, the disadvantages of the two systems disclosed lie in that equal storage space is allocated for any parcel, which results in waste of storage space. Furthermore, parallel express parcel storing and picking cabinets and arrangement of manipulators determine that the storage efficiency of express parcels depends on the operating speed of the manipulators, and only one parcel can be stored during operation once, so that the storage efficiency is limited.

SUMMARY OF THE INVENTION

A primary objective of the present invention is to provide a multi-unit rotary system and method for storage, intelligent sorting and picking of express parcels. Compared with a conventional large-scale logistics total distribution system, the present invention is more flexible and smaller in size, and better meet the requirements of the modern express parcel delivery industry for express parcel delivery and client's self-picking demand for express parcels.

For achieving the foregoing objectives, the present invention provides a multi-unit rotary system for storage, intelligent sorting and picking of express parcels comprises an input unit, a sorting unit, a rotary storage unit and an output unit, wherein an output opening of the input unit is connected with an input opening of the sorting unit, and a plurality of output openings of the sorting unit are respectively connected with different storage units of the rotary storage unit, and the different storage units of the rotary storage unit are connected with input openings of the output unit.

The rotary storage unit comprises an outer-layer annular guide rail, a rotating bracket, an inner-layer annular rail, a rotating bracket drive motor, a speed reducer, a drive shaft, and a plurality of rotary storage unit subunits.

The outer-layer annular guide rail, the rotating bracket and the inner-layer annular rail are sequentially arranged on the ground from the outside to the inside, inner lower edges of the rotary storage unit subunits are connected with the inner-layer annular rail, outer lower edges of the rotary storage unit subunits are connected with the outer-layer annular guide rail, and middle positions of lower ends of the rotary storage unit subunits are fixedly connected with an upper end of the rotating bracket; the rotating bracket drive motor is arranged on the ground, the speed reducer is connected to an output shaft of the rotating bracket drive motor, and the speed reducer drives the rotating bracket to rotate through the drive shaft of the rotary storage unit.

Each rotary storage unit subunit comprises a rotary storage subunit shelf portion and a rotary storage subunit base portion.

The rotary storage subunit shelf portion comprises a small parcel storage shelf, a medium parcel storage shelf, a large parcel storage shelf, and universal ball bearings; the small parcel storage shelf, the medium parcel storage shelf and the large parcel storage shelf are stacked in a vertical direction, and every two of the small parcel storage shelf, the medium parcel storage shelf and the large parcel storage shelf are connected by the universal ball bearing and one of the small parcel storage shelf, the medium parcel storage shelf and the large parcel storage shelf and a bottom plate are connected by the universal ball bearing.

The rotary storage subunit base portion comprises an express parcel baffle, a friction wheel driving device and the bottom plate, wherein the express parcel baffle is fixed to an upper end of the bottom plate and located on an inner side of the rotary storage subunit shelf portion; the friction wheel driving device is fixed to the upper end of the bottom plate, and is in contact with the rotary storage subunit shelf portion.

The friction wheel driving device comprises a friction wheel drive motor, a coupling, a bevel gear drive speed reducer, a sliding coupling sleeve, friction wheels, axial retaining rings, a plain bearing, a friction wheel position adjustment servo hydraulic cylinder, a first fixing frame, a second fixing frame, a fixing shaft and a drive shaft.

The friction wheel drive motor is connected with the bevel gear drive speed reducer through the coupling, the bevel gear drive speed reducer is fixed to one side of the first fixing frame, the first fixing frame is fixedly arranged at the upper end of the bottom plate, the bevel gear drive speed reducer is connected with the drive shaft of the friction wheel driving device through the sliding coupling sleeve, the drive shaft of the friction wheel driving device is connected with the friction wheel position adjustment servo hydraulic cylinder through the plain bearing, and the friction wheel position adjustment servo hydraulic cylinder is fixedly arranged on one side of the second fixing frame; one end of the fixing shaft is fixed to the other side of the first fixing frame, and the other end of the fixing shaft is fixed to the other side of the second fixing frame; and two friction wheels respectively sleeve the drive shaft of the friction wheel driving device and the fixing shaft, and are axially fixed on the drive shaft of the friction wheel driving device and the fixing shaft through the axial retaining rings, and the friction wheel on the drive shaft of the friction wheel driving device and the drive shaft of the friction wheel driving device are located in a circumferential direction in a key connection manner.

The output unit comprises an output unit mechanical arm, a spiral conveyor belt, and a client picking unit, wherein the output unit mechanical arm is connected with multiple layers of input openings of the spiral conveyor belt, and an output opening of the spiral conveyor belt is connected with the client picking unit.

The output unit mechanical arm comprises a first bracket, a ball screw drive motor, ball screws, nuts, connecting rods, a push plate telescopic hydraulic cylinder, a push plate, a stand column with balls, a lifting plate, a second bracket, a support base and a lifting plate telescopic hydraulic cylinder, wherein the ball screw drive motor is fixedly arranged at an upper end of the first bracket, and an output shaft of the ball screw drive motor is connected with one end of each ball screw through a transmission device, the other end of each ball screw is fixedly connected with the second bracket, and the second bracket is fixedly arranged at one of the input openings of the spiral conveyor belt; and one end of the connecting rods are connected with the ball screws through the nuts, the other end of the connecting rods are connected with the support base, the push plate telescopic hydraulic cylinder and the lifting plate telescopic hydraulic cylinder are fixedly arranged at an upper end of the support base, the push plate is arranged at one end of a piston rod of the push plate telescopic hydraulic cylinder, the lifting plate is arranged at one end of a piston rod of the lifting plate telescopic hydraulic cylinder, and the stand column with balls is arranged at an upper end of the lifting plate.

Gaps matched for use with the lifting plate are arranged between inner sides of every two of the small parcel storage shelf, the medium parcel storage shelf and the large parcel storage shelf and between the inner side of the large parcel storage shelf and an inner side of the bottom plate, respectively.

The express parcel baffle is located in an outlet direction of the sorting unit.

The input unit is provided with a visual sensor, a conveyor belt drive motor, a pressure sensor, a photoelectric sensor and a conveyor belt.

Two ball screws are arranged, four nuts are arranged, four connecting rods are arranged, and the two ball screws are arranged in parallel.

An intelligent sorting and picking method performed by using the multi-unit rotary system for storage, intelligent sorting and picking of express parcels, comprises the following steps of Step 1: the system is started.

Step 2: when an express parcel is placed in the input unit, the express parcel is photographed by a visual sensor to obtain a side view and a top view of the express parcel, an image edge detection algorithm is used to obtain the size of the express parcel so as to determine the type of the express parcel, the weight of the express parcel is obtained by a pressure sensor, a segmentation algorithm is used to extract a barcode from the photographed image, thereby obtaining the information of the sent and received express parcel, and when the express parcel passes through a photoelectric sensor, start time of the express parcel entering the sorting unit is obtained.

Step 3: according to the type of the express parcel, namely a small parcel, a medium parcel and a large parcel, one of the output openings of the sorting unit corresponding to the parcel is determined; according to the start time of the express parcel entering the sorting unit and a distance between the corresponding one of the output openings of the sorting unit and the input opening of the sorting unit, time when the parcel reaches corresponding one of the output openings of the sorting unit is obtained, and when the parcel reaches corresponding one of the output openings of the sorting unit, the sorting unit outputs the parcel to the rotary storage unit.

Step 4: when the type of the express parcel is determined, the rotary storage unit rotates a rotary storage unit subunit to which the parcel belongs to the position of the sorting unit, and rotates free storage space of a shelf to which the parcel belongs to corresponding one of the output openings of the sorting unit, wherein the shelf is the small parcel storage shelf, the medium parcel storage shelf and the large parcel storage shelf.

Step 5: when there is a request for picking up, the rotary storage unit subunit where the parcel is located is rotated to the position of the output unit, and the storage space of the shelf where the parcel is located is rotated to one of the input openings of the output unit, the parcel is then lifted up through a lifting plate and pushed out by a push plate to one of input openings of a spiral conveyor belt, and the spiral conveyor belt conveys the parcel to a client picking unit, thereby completing the sorting and picking processes of the express parcel.

Step 4 that when the type of the express parcel is determined, the rotary storage unit rotates the shelf to which the parcel belongs to the position of the sorting unit, and rotates the free storage space of the shelf to which the parcel belongs to corresponding one of the output openings of the sorting unit, specially comprises the following steps:

Step 4-1: according to the type of the express parcel, the rotating bracket drive motor is controlled to drive the rotating bracket to rotate so as to drive the rotary storage unit subunit to rotate, and the rotary storage unit subunit to which the parcel belongs is rotated to the position of the sorting unit.

Step 4-2: the system adjusts an extension length of a piston rod of a friction wheel position adjustment servo hydraulic cylinder and adjusts the positions of friction wheels to upper and lower edges of the shelf to which the parcel belongs.

Step 4-3: the system controls rotation of an output shaft of a friction wheel drive motor to drive the friction wheels to rotate, thereby driving the free storage space of the shelf to reach the output opening of the sorting unit to which the parcel belongs, and then rotation is stopped.

Step 5 that when there is a request for picking up, the rotary storage unit subunit to which the parcel belongs is rotated to the position of the output unit, and the storage space of the shelf where the parcel is located is rotated to one of the input openings of the output unit, the parcel is then lifted up through the lifting plate and pushed out by the push plate to one of the input opening of the spiral conveyor belt, and the spiral conveyor belt conveys the parcel to the client picking unit, thereby completing the sorting and picking processes of the express parcel, specially comprises the following steps:

Step 5-1: when there is a request for picking up, the rotating bracket drive motor is controlled to drive the rotating bracket to rotate, and the rotary storage unit subunit is then driven to rotate so that the rotary storage unit subunit where the parcel is located is rotated to the position of the output unit.

Step 5-2: the system adjusts an extension length of a piston rod of a friction wheel position adjustment servo hydraulic cylinder and adjusts the positions of friction wheels to upper and lower edges of the shelf to which the parcel belongs.

Step 5-3: the system controls an output shaft of the friction wheel drive motor to rotate, and the friction wheels are then driven to rotate to further drive the storage space of the shelf where the parcel is located to rotate to one of the input openings of the output unit.

Step 5-4: the system controls an output shaft of a ball screw drive motor to rotate, and ball screws are then driven to rotate to further drive the lifting plate on a support base to reach a gap in a lower end of the shelf to which the parcel belongs.

Step 5-5: the system controls a piston rod of a lifting plate telescopic hydraulic cylinder to extend out, and the lifting plate is then driven to extend into the gap in the lower end of the shelf.

Step 5-6: the system controls the output shaft of the ball screw drive motor to rotate, and the ball screws are then driven to rotate to further drive the lifting plate on the support base to rise, thereby lifting the parcel up.

Step 5-7: the system controls a piston rod of a push plate telescopic hydraulic cylinder to extend out, and the push plate is then driven to move forward to push out the parcel from the lifting plate to one of the input openings of the spiral conveyor belt.

Step 5-8: the spiral conveyor belt then conveys the parcel to the client picking unit.

The multi-unit rotary system and method for storage, intelligent sorting and picking of express parcels disclosed by the present invention have the following advantages:

Through adoption of layered design of the rotary storage unit, different sizes of parcels are stored in a sorting manner, thereby effectively increasing the utilization rate of the storage space; besides, due to the storage design of the subunits, arrangement of storage units of the system is more flexible, and the number of the rotary storage unit subunits can be set freely according to the requirements for site space and the storage capacity for express parcels; through adoption of overall unit combination design of the present invention, the mounting, the layout and the maintenance of the system are more convenient, and during the operation of the system, automatic sorting and storage of the express parcels are achieved, so that the participation degree of people is effectively reduced, and the labour cost is reduced. The present invention further provides a self-service picking and taking mechanism for clients; and because the mechanism has the fast and accurate characteristics, the problems that manual sorting is time-consuming and labour-consuming and a certain risk of mistaking can be caused, are solved. The express parcel sorting and storage method proposed by the present invention can sort and store large batches of express parcels at the same time, and storage efficiency is high.

DETAILED DESCRIPTION OF THE PREFERRED EMBODIMENT

Embodiments of the present invention will be further described below in combination with the accompanying drawings.

Figure 1A:
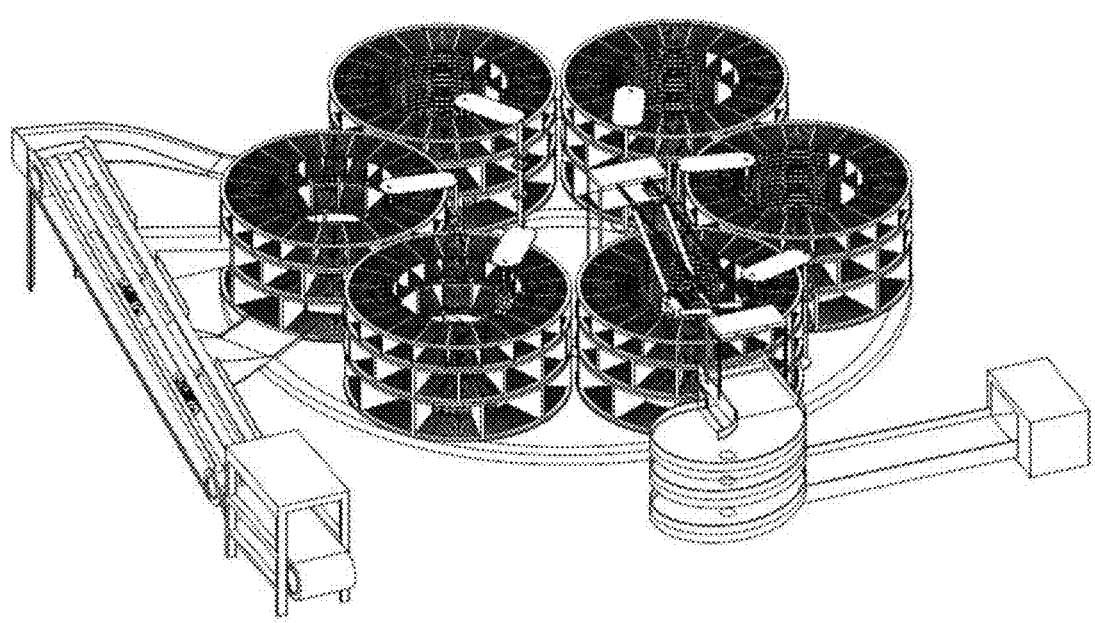
FIG. 1a is perspective schematic diagram of the overall structure of the multi-unit rotary system for storage, intelligent sorting and picking of express parcels according to an embodiment of the present invention.
Figure 1B:
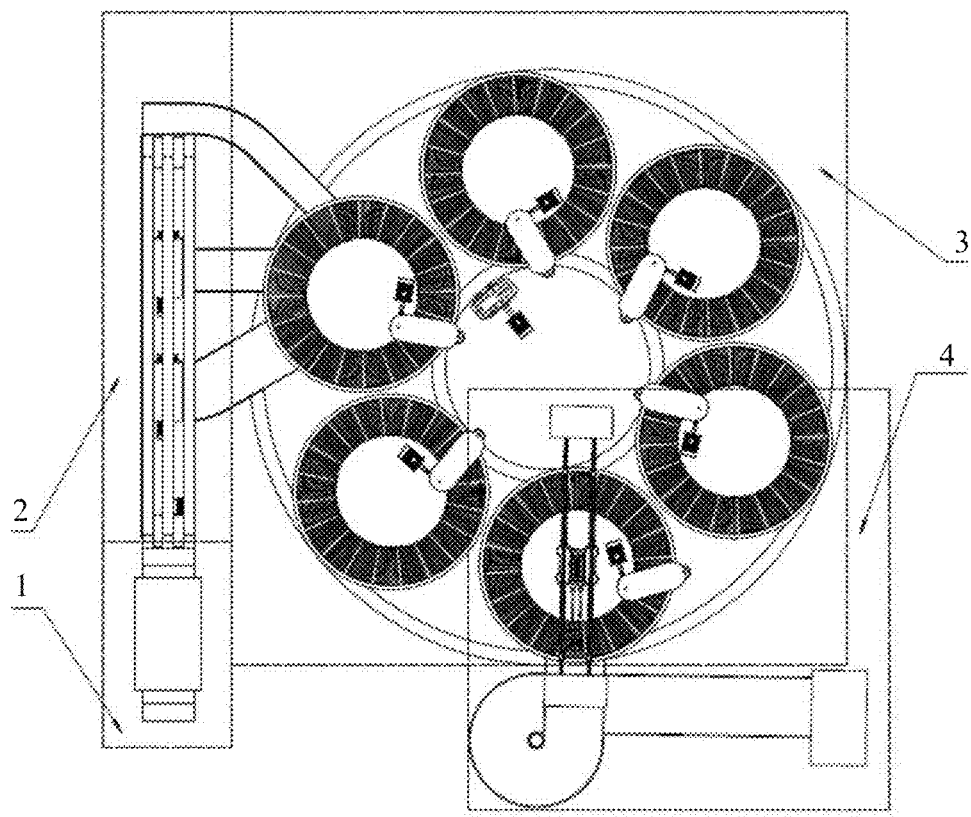
FIG. 1b is a top view of the overall structure of the multi-unit rotary system for storage, intelligent sorting and picking of express parcels according to an embodiment of the present invention, wherein 1 represents an input unit, 2 represents a sorting unit, 3 represents a rotary storage unit, and 4 represents an output unit.

In some embodiments of the present invention, as shown in FIG. 1a and FIG. 1a, the multi-unit rotary system for storage, intelligent sorting and picking of express parcels comprises an input unit 1, a sorting unit 2, a rotary storage unit 3 and an output unit 4. An output opening of the input unit 1 is connected with an input opening of the sorting unit 2, and a plurality of output openings of the sorting unit 2 are respectively connected with different storage units of the rotary storage unit 3, and the different storage units of the rotary storage unit 3 are connected with input openings of the output unit 4.

Figure 2:
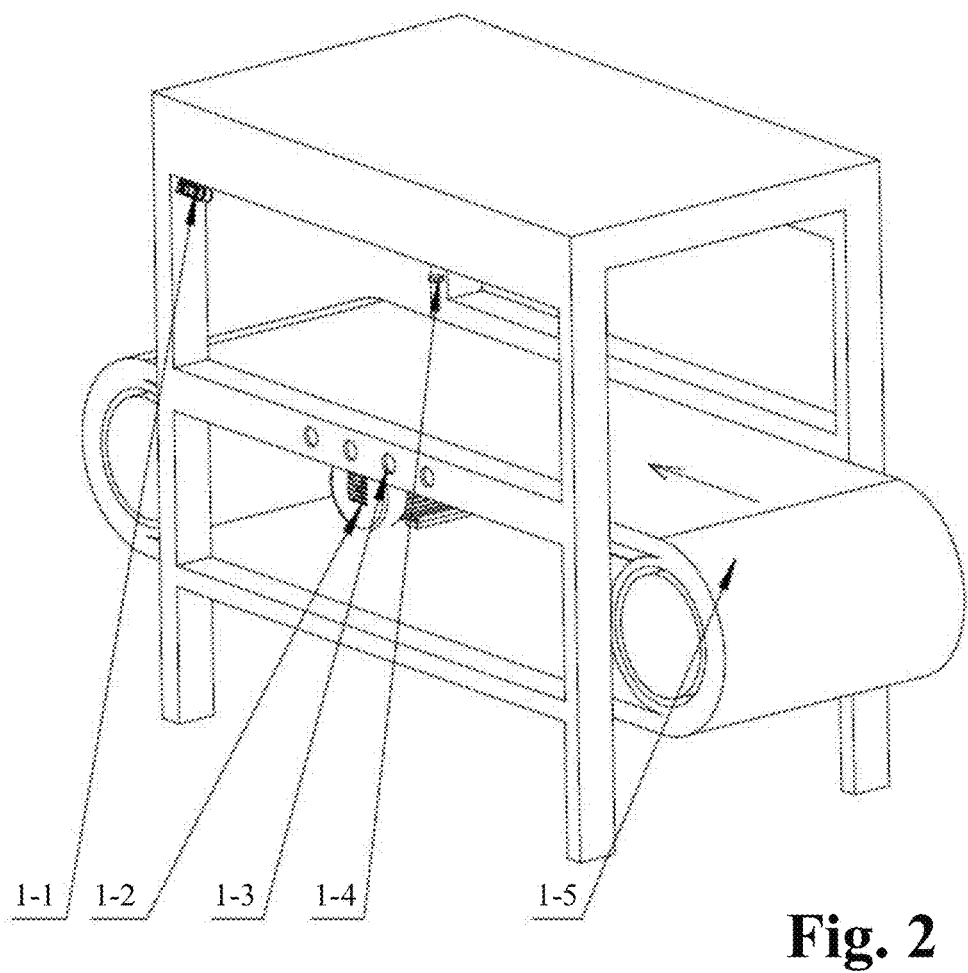
FIG. 2 is a schematic structural diagram of the input unit according to an embodiment of the present invention, wherein 1-1 represents a visual sensor, 1-2 represents a conveyor belt drive motor, 1-3 represents a pressure sensor, 1-4 represents a photoelectric sensor, and 1-5 represents a conveyor belt.

In some embodiments of the present invention, as shown in FIG. 2, the input unit 1 is provided with a visual sensor 1-1, a conveyor belt drive motor 1-2, a pressure sensor 1-3, a photoelectric sensor 1-4, and a conveyor belt 1-5. The visual sensor 1-1 is a Omron FZ4-L350 visual sensor, the conveyor belt drive motor 1-2 is a Y160L-4 15 Kw three-phase asynchronous motor, the pressure sensor 1-3 is a Transcell BSH-20 kg weighting sensor, and the photoelectric sensor 1-4 is Banner VS2KRP5VQ through-beam photoelectric sensor.

In some embodiments of the present invention, the input unit 1 is located at the most front end of the system and configured to perform size determination and barcode information input on fed express parcels through the visual sensor 1-1; and the mass information of the express parcels is obtained through the pressure sensor 1-3, so that information collection for the express parcels is completed.

Figure 3A:
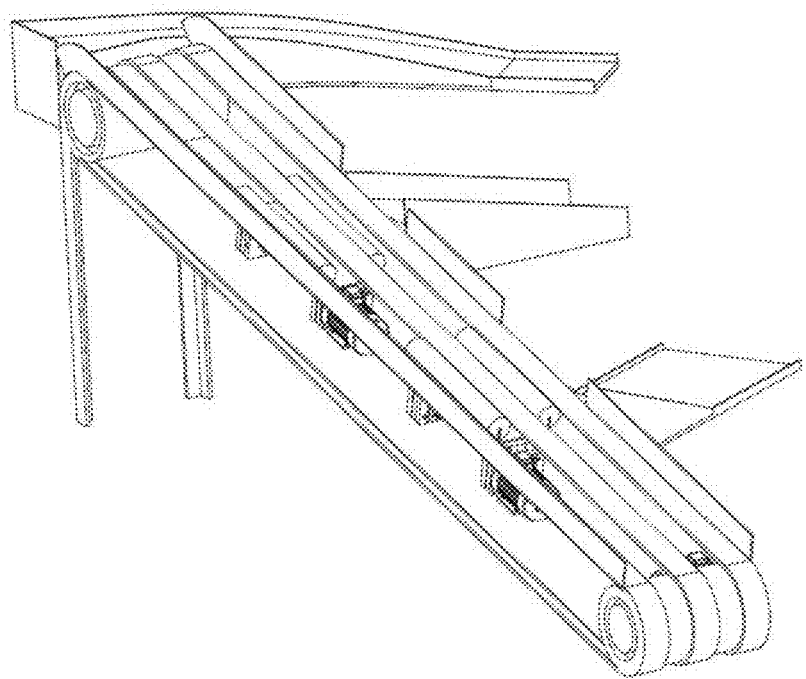
FIG. 3a is a perspective schematic diagram of the sorting unit according to an embodiment of the present invention.
Figure 3B:
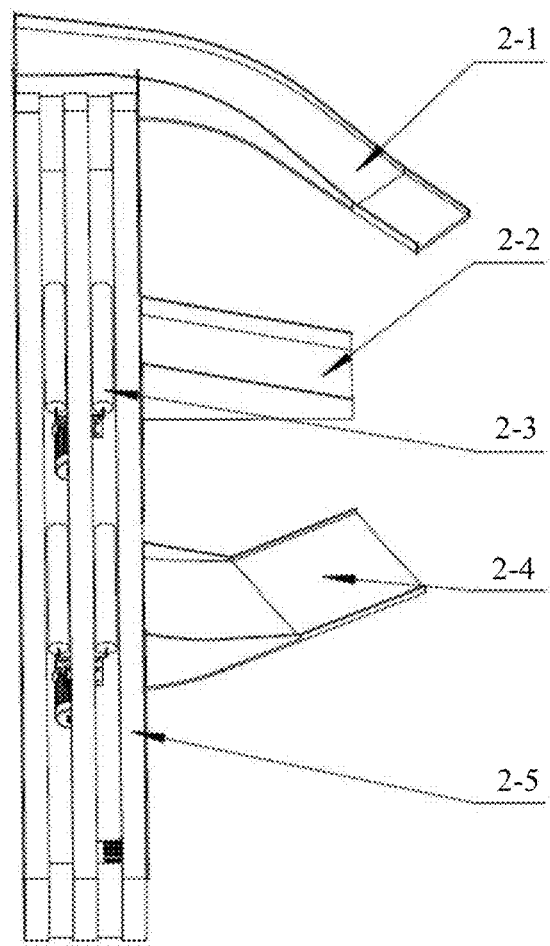
FIG. 3b is a top view of the sorting unit according to an embodiment of the present invention, wherein 2-1 represents a small parcel slideway, 2-2 represents a medium parcel slideway, 2-3 represents a transverse rubber roller, 2-4 represents a large parcel slideway, and 2-5 represents a main conveyor belt.
Figure 3C:
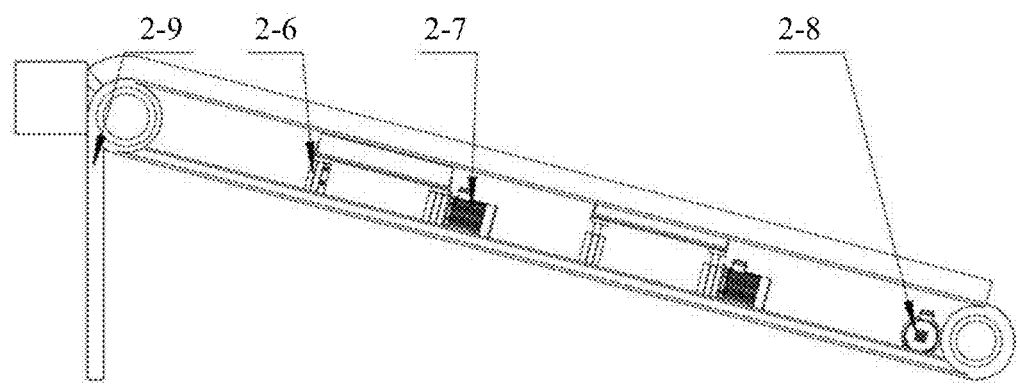
FIG. 3c is a side view of the sorting unit according to an embodiment of the present invention, wherein 2-6 represents a push hydraulic cylinder, 2-7 represents a transverse rubber roller drive motor, 2-8 represents a conveyor belt drive motor, and 2-9 represents a slope bracket.

In some embodiments of the present invention, as shown in FIG. 3a to FIG. 3c, the sorting unit 2 comprises a small parcel slideway 2-1, a medium parcel slideway 2-2, transverse rubber rollers 2-3, a large parcel slideway 2-4, a main conveyor belt 2-5, push hydraulic cylinders 2-6, a transverse rubber roller drive motor 2-7, a conveyor belt drive motor 2-8 (Y160L-4 15 Kw three-phase asynchronous motor) and a slop bracket 2-9. A main conveyor belt 2-5 is arranged on the slope bracket 2-9, the conveyor belt drive motor 2-8 is arranged at a lower end of the slope bracket 2-9, the small parcel slideway 2-1 is arranged at an upper end of the slope bracket 2-9, the medium parcel slideway 2-2 and the large parcel slideway 2-4 are respectively arranged at different height positions in the middle of the slope bracket 2-9, two transverse rubber rollers 2-3 are respectively arranged on the slope bracket 2-9 and respectively aligned with the medium parcel slideway 2-2 and the large parcel slideway 2-4, that is, parcels are pushed out to the medium parcel slideway 2-2 or the large parcel slideway 2-4 through the rotation of the transverse rubber rollers 2-3. The push hydraulic cylinders 2-6 and the transverse rubber roller drive motor 2-7 are arranged between the transverse rubber rollers 2-3 and the slope bracket 2-9. The push hydraulic cylinders 2-6 are used to push up the transverse rubber rollers 2-3 to pass through a gap in the middle of the main conveyor belt 2-5, and the transverse rubber roller drive motor 2-7 is used to drive the transverse rubber rollers 2-3 to rotate transversely.

In some embodiments of the present invention, the sorting unit 2 works in the following way: the express parcels after information input through the input unit 1 enter the main conveyor belt 2-5, and the transverse rubber roller drive motor 2-7 is controlled by the system to start, and because information of the belt speed and time when the express parcels enter the main conveyor belt 2-5 is known, the push hydraulic cylinders 2-6 at corresponding sorting positions are started. A lateral speed is provided for the large express parcels through a first level of transverse rubber roller 2-3, the large express parcels enter a large parcel storage shelf 3-7-1-3 through the large parcel slideway 2-4. A lateral speed is provided for the medium express parcels through a second level of transverse rubber roller 2-3, the medium express parcels enter a medium parcel storage shelf 3-7-1-2 through the medium parcel slideway 2-2. And small express parcels are directly transported to one end of the main conveyor belt 2-5 and enter a small parcel storage shelf 3-7-1-1 through the small parcel slideway 2-1, thereby achieving the sorting of express parcels.

Figure 4A:
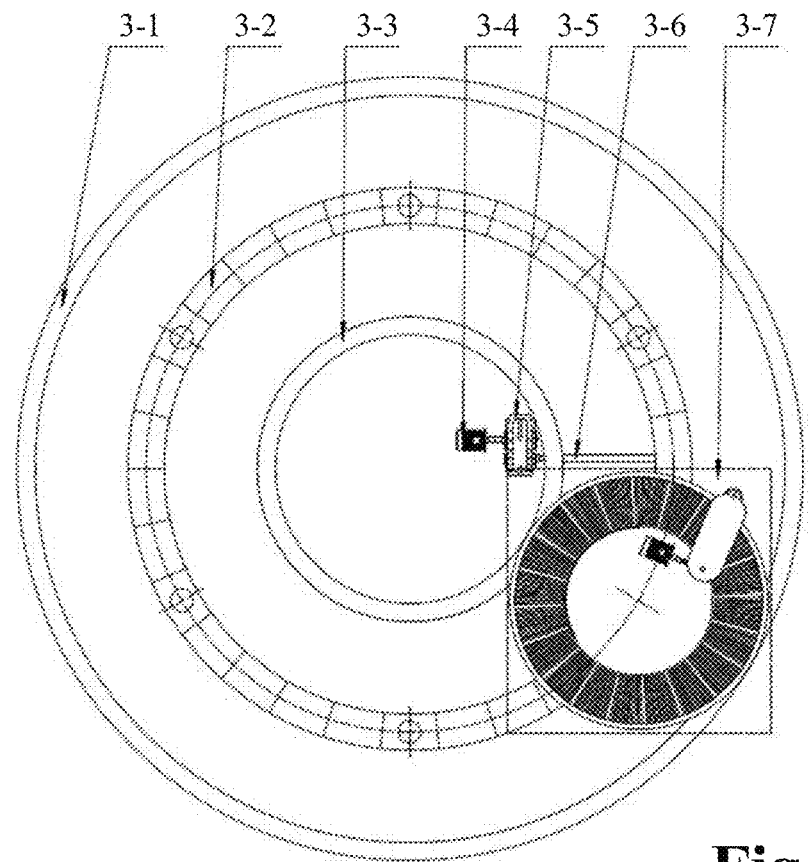
FIG. 4a is a top view of the rotary storage unit according to an embodiment of the present invention, wherein 3-1 represents an outer-layer annular guide rail, 3-2 represents a rotating bracket, 3-3 represents an inner-layer annular rail, 3-4 represents a rotating bracket drive motor, 3-5 represents a speed reducer, 3-6 represents a drive shaft, and 3-7 represents a rotary storage unit subunit.

In some embodiments of the present invention, as shown in FIG. 4a, the rotary storage unit 3 comprises an outer-layer annular guide rail 3-1, a rotating bracket 3-2, an inner-layer annular rail 3-3, a rotating bracket drive motor 3-4, a speed reducer 3-5, a drive shaft 3-6 and a plurality of rotary storage unit subunits 3-7. The rotating bracket drive motor 3-4 is a TYCX280M-4 90 Kw rare earth permanent magnet synchronous motor. The outer-layer annular guide rail 3-1, the rotating bracket 3-2 and the inner-layer annular rail 3-3 are sequentially arranged on the ground from the outside to the inside. Inner lower edges of the rotary storage unit subunits 3-7 are connected with the inner-layer annular rail 3-3, outer lower edges of the rotary storage unit subunits 3-7 are connected with the outer-layer annular guide rail 3-1, and middle positions of lower ends of the rotary storage unit subunits 3-7 are fixedly connected with an upper end of the rotating bracket 3-2. The rotating bracket drive motor 3-4 is arranged on the ground, the speed reducer 3-5 is connected to an output shaft of the rotating bracket drive motor 3-4, and the speed reducer 3-5 drives the rotating bracket 3-2 to rotate through the drive shaft 3-6.

Figure 4B:
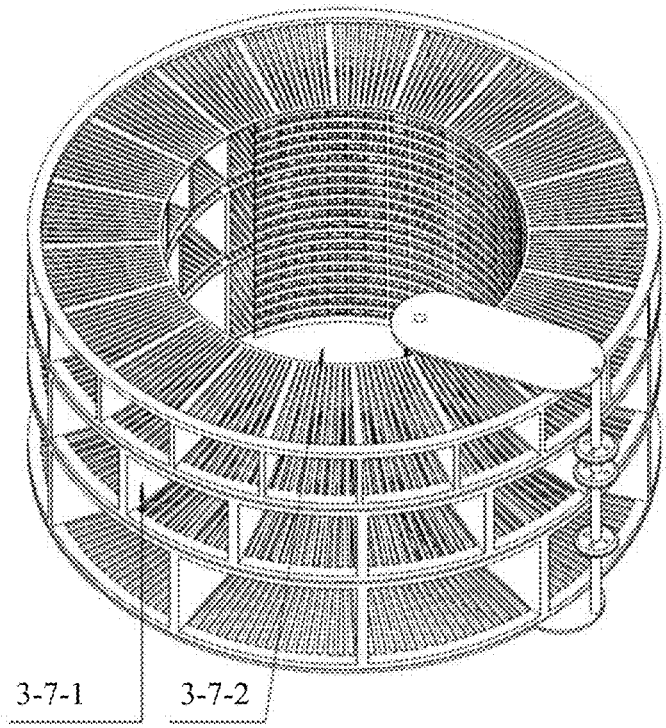
FIG. 4b is a schematic structural diagram of the rotary storage unit subunit according to an embodiment of the present invention, wherein 3-7-1 represents a rotary storage subunit shelf portion, and 3-7-2 represents a rotary storage subunit base portion.

In some embodiments of the present invention, as shown in FIG. 4*b*, each rotary storage unit subunit 3-7 comprises a rotary storage subunit shelf portion 3-7-1 and a rotary storage subunit base portion 3-7-2.

In some embodiments of the present invention, three layers at bottom, middle and upper parts of the rotary storage unit subunits store three types of express parcels in large, medium and small sizes, respectively, and each layer of shelf can be separately rotated under the driving of a friction wheel 3-7-2-2-5, so that each layer can store different express parcels separately. All the rotary storage unit subunits 3-7 are driven by the rotating bracket drive motor 3-4, and the rotating bracket drive motor 3-4 drives the rotating bracket 3-2 to rotate to drive the rotary storage unit subunits 3-7 to move along the outer-layer annular guide rail 3-1, thus achieving a function of storing express parcels at the position of the sorting unit 2 and a function of delivering express parcels at the position of the output unit 4. After the shelf of one rotary storage unit subunit 3-7 is full, the next rotary storage unit subunit 3-7 can be moved to the position of the sorting unit 2. If there is a request for picking up after the express parcels are stored, the rotary storage unit subunit 3-7 where the express parcel requested is located can also be moved to the position of the output unit 4.

Figure 4C:
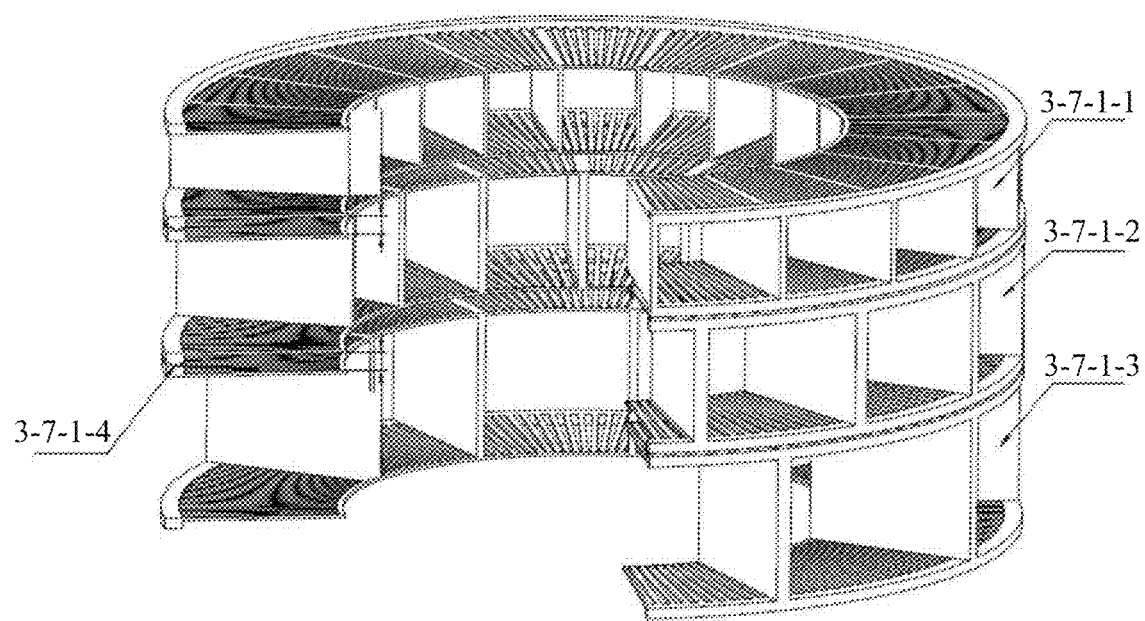
FIG. 4c is a schematic structural diagram of the rotary storage subunit shelf portion according to an embodiment of the present invention, wherein 3-7-1-1 represents a small parcel storage shelf, 3-7-1-2 represents a medium parcel storage shelf, 3-7-1-3 represents a large parcel storage shelf, and 3-7-1-4 represents a universal ball bearing.

In some embodiments of the present invention, as shown in FIG. 4*c*, the rotary storage subunit shelf portion 3-7-1 includes a small parcel storage shelf 3-7-1-1, a medium parcel storage shelf 3-7-1-2, a large parcel storage shelf 3-7-1-3 and universal ball bearings 3-7-1-4. The small parcel storage shelf 3-7-1-1, the medium parcel storage shelf 3-7-1-2 and large parcel storage shelf 3-7-1-3 are stacked in a vertical direction, and every two of the small parcel storage shelf 3-7-1-1, the medium parcel storage shelf 3-7-1-2 and the large parcel storage shelf 3-7-1-3 are connected by the universal ball bearing 3-7-1-4 and the large parcel storage shelf 3-7-1-3 and a bottom plate 3-7-2-3 are connected by the universal ball bearing 3-7-1-4, so that the small parcel storage shelf 3-7-1-1, the medium parcel storage shelf 3-7-1-2 and the large parcel storage shelf 3-7-1-3 can rotate freely. Gaps matched for use with a lifting plate 4-1-9 are formed between inner sides of every two of the small parcel storage shelf 3-7-1-1, the medium parcel storage shelf 3-7-1-2 and the large parcel storage shelf 3-7-1-3 and between the inner side of the large parcel storage shelf 3-7-1-3 and an inner side of the bottom plate 3-7-2-3, respectively.

Figure 4D:
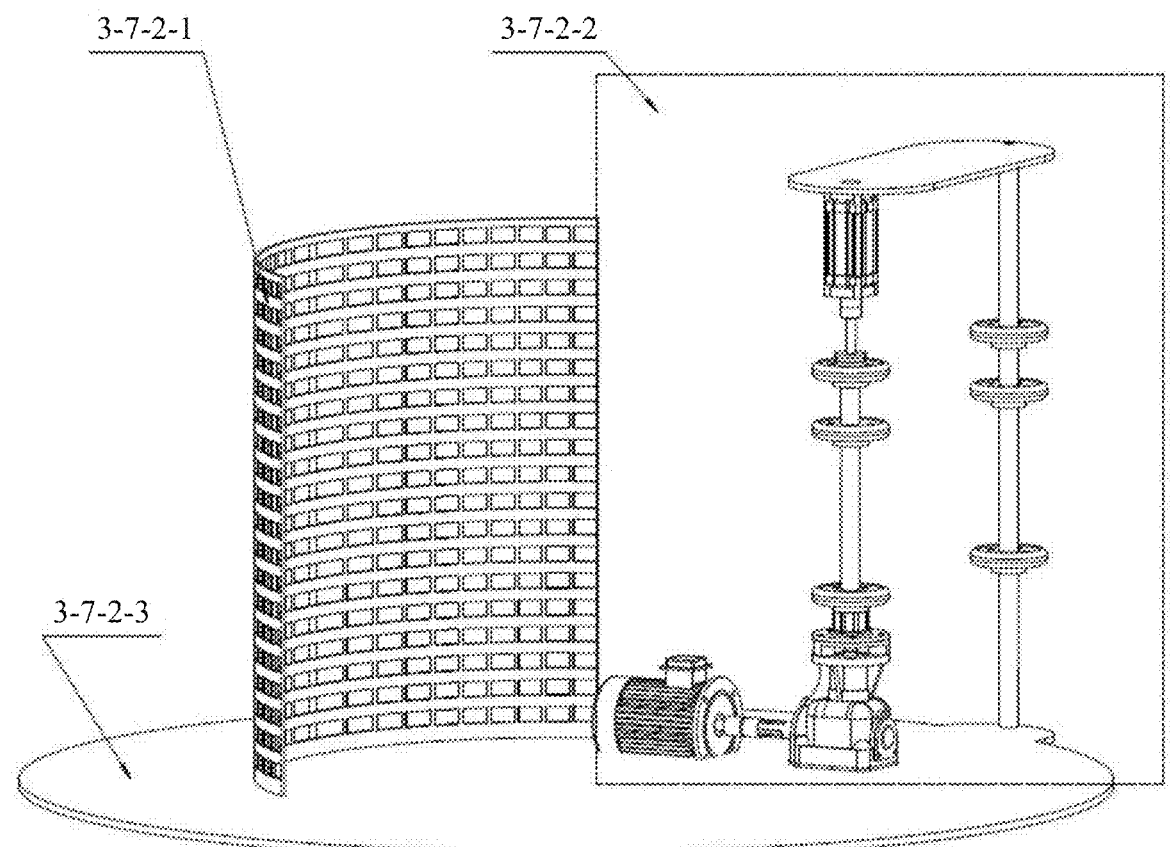
FIG. 4d is a schematic structural diagram of the rotary storage subunit base portion according to an embodiment of the present invention, wherein 3-7-2-1 represents an express parcel baffle, 3-7-2-2 represents a friction wheel driving device, and 3-7-2-3 represents a bottom plate.

In some embodiments of the present invention, as shown in FIG. 4*d*, the rotary storage subunit base portion 3-7-2 comprises an express parcel baffle 3-7-2-1, a friction wheel driving device 3-7-2-2 and the bottom plate 3-7-2-3. The express parcel baffle 3-7-2-1 is fixed to an upper end of the bottom plate 3-7-2-3 and located on an inner side of the rotary storage subunit shelf portion 3-7-1. The friction wheel driving device 3-7-2-2 is fixed to the upper end of the bottom plate 3-7-2-3, and is in contact with the rotary storage subunit shelf portion 3-7-1. The express parcel baffle 3-7-2-1 is located in an outlet direction of the sorting unit 2, that is, namely on the inner side of the rotary storage unit subunit 3-7, so that express parcels from the slideways can stay in corresponding storage space.

Figure 4E:
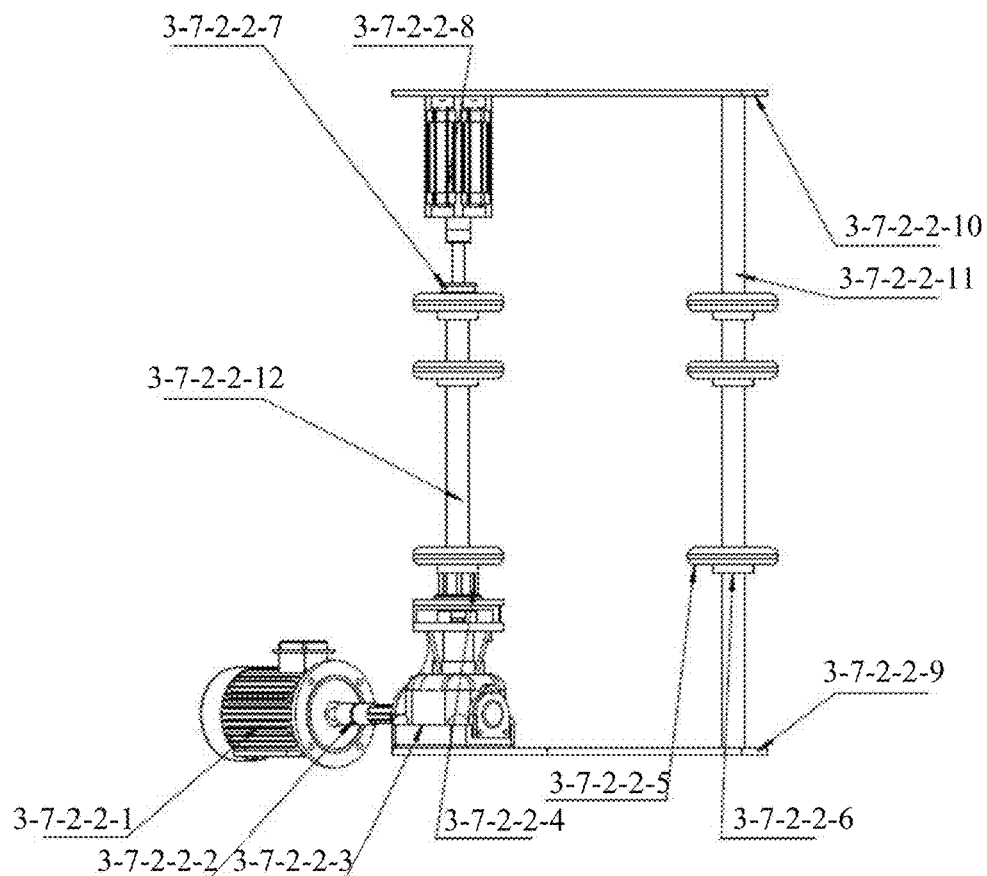
FIG. 4e is a schematic structural diagram of the friction wheel driving device according to an embodiment of the present invention, wherein 3-7-2-2-1 represents a friction wheel drive motor, 3-7-2-2-2 represents a coupling, 3-7-2-2-3 represents a bevel gear drive speed reducer, 3-7-2-2-4 represents a sliding coupling sleeve, 3-7-2-2-5 represents a friction wheel, 3-7-2-2-6 represents an axial retaining ring, 3-7-2-2-7 represents a plain bearing, 3-7-2-2-8 represents a friction wheel position adjustment servo hydraulic cylinder, 3-7-2-2-9 represents a first fixing frame, 3-7-2-2-10 represents a second fixing frame, 3-7-2-2-11 represents a fixing shaft, and 3-7-2-2-12 represents a drive shaft.

In some embodiments of the present invention, as shown in FIG. 4*e*, the friction wheel driving device 3-7-2-2 comprises a friction wheel drive motor 3-7-2-2-1 (Y180L-4 22 Kw three-phase asynchronous motor), a coupling 3-7-2-2-2, a bevel gear drive speed reducer 3-7-2-2-3, a sliding coupling sleeve 3-7-2-2-4, friction wheels 3-7-2-2-5, axial retaining rings 3-7-2-2-6, a plain bearing 3-7-2-2-7, a friction wheel position adjustment servo hydraulic cylinder 3-7-2-2-8, a first fixing frame 3-7-2-2-9, a second fixing frame 3-7-2-2-10, a fixing shaft 3-7-2-2-11 and a drive shaft 3-7-2-2-12. The friction wheel drive motor 3-7-2-2-1 is connected with the bevel gear drive speed reducer 3-7-2-2-3 through the coupling 3-7-2-2-2, the bevel gear drive speed reducer 3-7-2-2-3 is fixed to one side of the first fixing frame 3-7-2-2-9, and the first fixing frame 3-7-2-2-9 is fixedly arranged at the upper end of the bottom plate 3-7-2-3, the bevel gear drive speed reducer 3-7-2-2-3 is connected with the drive shaft 3-7-2-2-12 through the sliding coupling sleeve 3-7-2-2-4, the drive shaft 3-7-2-2-12 is connected with the friction wheel position adjustment servo hydraulic cylinder 3-7-2-2-8 through the plain bearing 3-7-2-2-7, and the friction wheel position adjustment servo hydraulic cylinder 3-7-2-2-8 is fixedly arranged on one side of the second fixing frame 3-7-2-2-10. One end of the fixing shaft 3-7-2-2-11 is fixed to the other side of the first fixing frame 3-7-2-2-9, and the other end of the fixing shaft 3-7-2-2-11 is fixed to the other side of the second fixing frame 3-7-2-2-10. Two friction wheels 3-7-2-2-5 respectively sleeve the drive shaft 3-7-2-2-12 and the fixing shaft 3-7-2-2-11, and are axially fixed on the drive shaft 3-7-2-2-12 and the fixing shaft 3-7-2-2-11 through the axial retaining rings 3-7-2-2-6, and the friction wheel 3-7-2-2-5 on the drive shaft 3-7-2-2-12 and the drive shaft 3-7-2-2-12 are located in a circumferential direction in a key connection manner.

In some embodiments of the present invention, the friction wheel driving device 3-7-2-2 is driven by the motor to rotate the friction wheels 3-7-2-2-5 and adjusts the positions of the friction wheels 3-7-2-2-5 under the action of the friction wheel position adjustment servo hydraulic cylinder 3-7-2-2-8, so that the friction wheels 3-7-2-2-5 are only in contact with upper and lower edges of one layer of shelf at a time. Other friction wheels 3-7-2-2-5 cannot transmit torque due to being located in the middle of the other layers of shelves, thereby achieving the purpose of enabling each shelf to rotate independently.

Figure 5A:
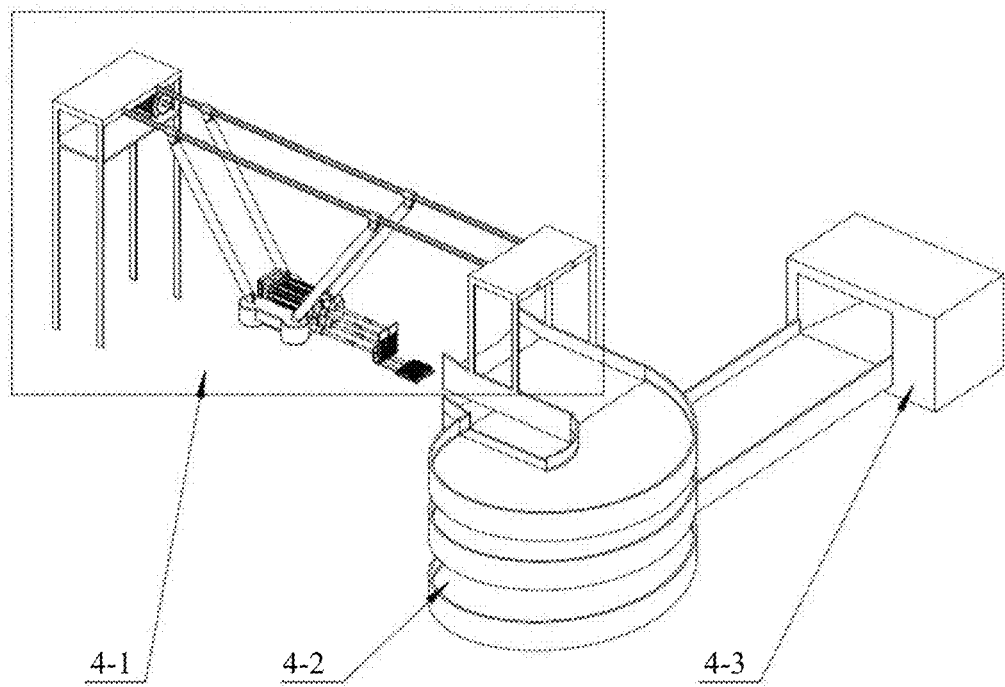
FIG. 5a is a perspective schematic diagram of the structure of the output unit according to an embodiment of the present invention, wherein 4-1 represents an output unit mechanical arm, 4-2 represents a spiral conveyor belt, and 4-3 represents a client picking unit.

In some embodiments of the present invention, as shown in FIG. 5*a*, the output unit 4 comprises an output unit mechanical arm 4-1, a spiral conveyor belt 4-2 and a client picking unit 4-3. The output unit mechanical arm 4-1 is connected with multiple layers of input openings of the spiral conveyor belt 4-2. In some embodiments of the present invention, the spiral conveyor belt 4-2 is provided with three input openings, and the three input openings respectively correspond to the three layers of storage space of the rotary storage unit subunits 3-7. An output opening of the spiral conveyor belt 4-2 is connected with the client picking unit 4-3.

In some embodiments of the present invention, the output unit 4 uses screw drive and a link mechanism to translate the mechanical arm up and down to the storage height of an express parcel to be picked, and then a piston rod of a lifting plate telescopic hydraulic cylinder 4-1-12 extends out to drive the lifting plate 4-1-9 to extend into a gap under the storage shelf where the parcel is located, the mechanical arm is driven through the screw drive and the link mechanism to rise by a certain distance to lift up the express parcel, and then a piston rod of a push plate telescopic hydraulic cylinder 4-1-6 extends out to drive a push plate 4-1-7, so that specified express parcels on the three layers of storage shelves can be pushed out from storage areas, respectively.

In some embodiments of the present invention, the spiral conveyor belt 4-2 is a three-layer spiral belt conveyor which quickly conveys the pushed express parcels to the client picking unit 4-3.

In some embodiments of the present invention, the client picking unit 4-3 firstly reads a picking code input by a client or scans a picking barcode of the client, processes the identified information, determines the storage location of an express parcel to be picked, communicates with a control system, rotates the rotary storage unit subunit 3-7 where the parcel is located to the position of the output unit 4, rotates the storage space of the shelf where the parcel is located to one of the input openings of the output unit 4, lifts up the express parcel through the lifting plate 4-1-9, and pushes the parcel to one of the input openings of the spiral conveyor belt 4-2 through the push plate 4-1-7, and then the spiral conveyor belt 4-2 conveys the express parcel to the client picking unit 4-3, thereby completing the picking of the express parcel.

Figure 5B:
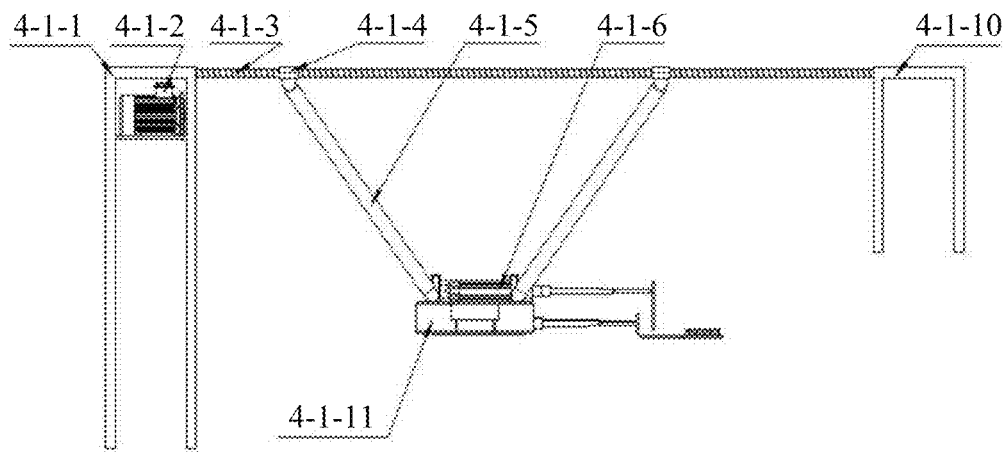
FIG. 5b is a schematic structural diagram of the output unit mechanical arm according to an embodiment of the present invention, wherein 4-1-1 represents a first bracket, 4-1-2 represents a ball screw drive motor, 4-1-3 represents a ball screw, 4-1-4 represents a nut, 4-1-5 represents a connecting rod, 4-1-6 represents a push plate telescopic hydraulic cylinder, 4-1-10 represents a second bracket, and 4-1-11 represents a support base.
Figure 5C:
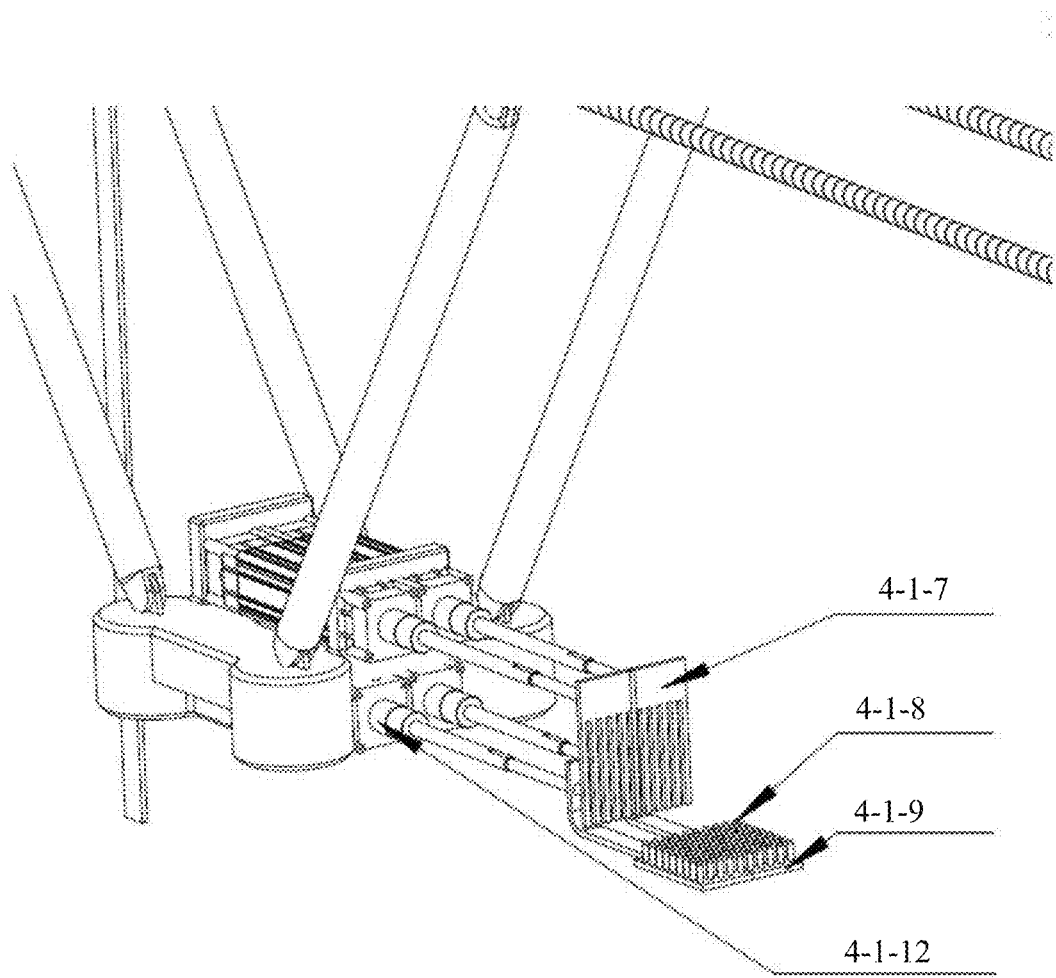
FIG. 5c is a schematic diagram of the output unit mechanical arm from another view according to an embodiment of the present invention, wherein 4-1-7 represents a push plate, 4-1-8 represents a stand column with balls, 4-1-9 represents a lifting plate, 4-1-10 represents a second bracket, and 4-1-12 represents a lifting plate telescopic hydraulic cylinder.

In some embodiments of the present invention, as shown in FIG. 5b and FIG. 5c, the output unit mechanical arm 4-1 comprises a first bracket 4-1-1, a ball screw drive motor 4-1-2 (Y180L-4 22 Kw three-phase asynchronous motor), ball screws 4-1-3, nuts 4-1-4, connecting rods 4-1-5, the push plate telescopic hydraulic cylinder 4-1-6, the push plate 4-1-7, a stand column 4-1-8 with balls, the lifting plate 4-1-9, a second bracket 4-1-10, a support base 4-1-11, and the lifting plate telescopic hydraulic cylinder 4-1-12. In some embodiments of the present invention, two ball screws 4-1-3 are arranged, four nuts 4-1-4 are arranged, four connecting rods 4-1-5 are arranged, and the two ball screws 4-1-3 are arranged in parallel. The ball screw drive motor 4-1-2 is fixedly arranged at an upper end of the first bracket 4-1-1, an output shaft of the ball screw drive motor 4-1-2 is connected with one end of each ball screw 4-1-3 through a transmission device, the other end of each ball screw 4-1-3 is fixedly connected with the second bracket 4-1-10, and the second bracket 4-1-10 is fixedly arranged at one of the input openings of the spiral conveyor belt 4-2. One end of the connecting rods 4-1-5 are connected with the ball screws 4-1-3 through the nuts 4-1-4, and the other end of the connecting rods 4-1-5 are connected with the support base 4-1-11. The push plate telescopic hydraulic cylinder 4-1-6 and the lifting plate telescopic hydraulic cylinder 4-1-12 are fixedly arranged at an upper end of the support base 4-1-11, the push plate 4-1-7 is arranged at one end of the piston rod of the push plate telescopic hydraulic cylinder 4-1-6, the lifting plate 4-1-9 is arranged at one end of the piston rod of the lifting plate telescopic hydraulic cylinder 4-1-12, and the stand column 4-1-8 with balls is arranged at an upper end of the lifting plate 4-1-9.

In some embodiments of the present invention, a Siemens SIMATIC S7-200 programmable controller control system is used for controlling the operation of each unit, an output end of the visual sensor 1-1, an output end of the pressure sensor 1-3, and an output end of the photoelectric sensor 1-4, and an output end of the client picking unit 4-3 are connected with an input end of the programmable controller, and an output end of the programmable controller is respectively connected with each motor contactor and each control valve block of the hydraulic system.

Figure 6:
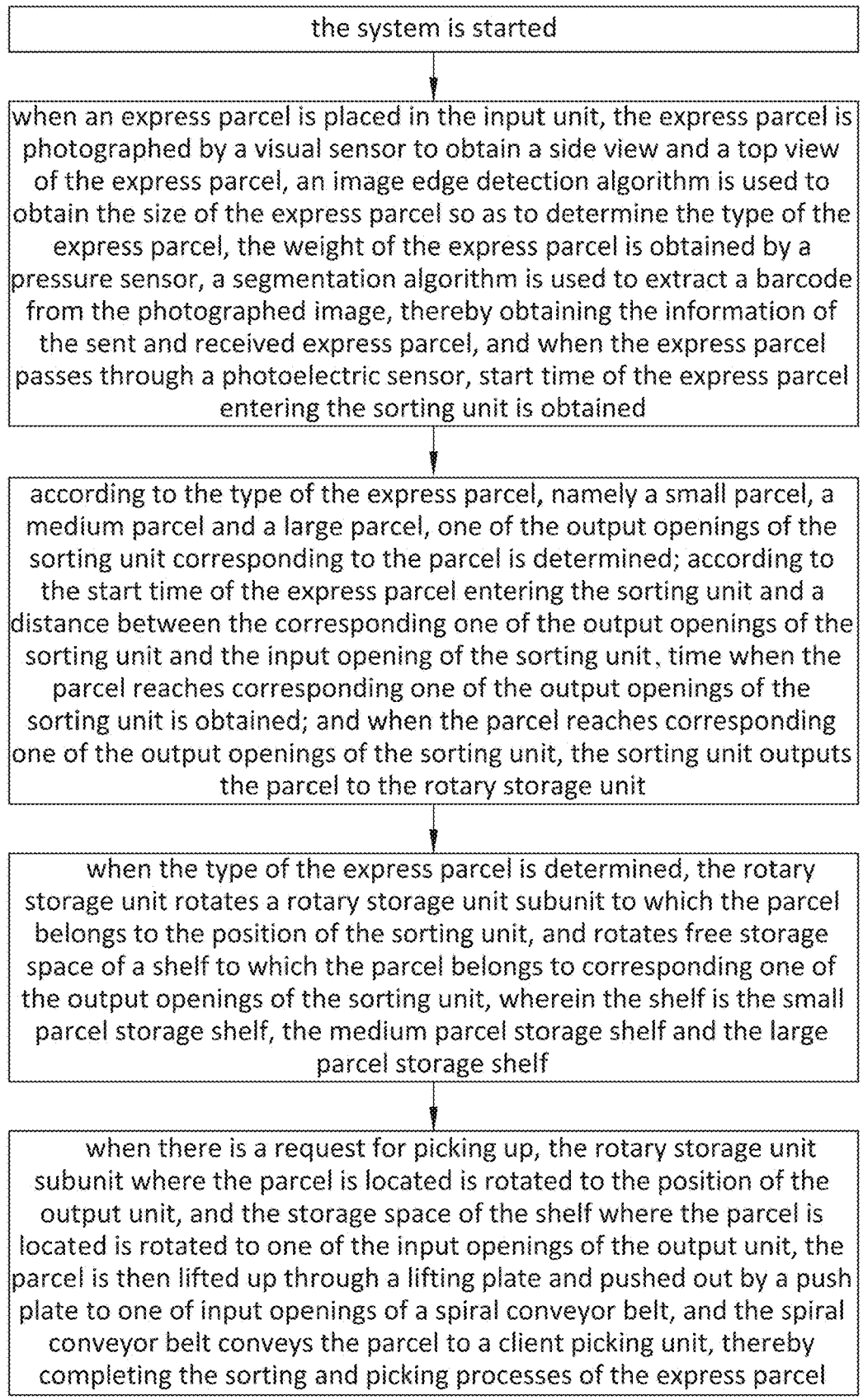
FIG. 6 is a flow chart of the multi-unit rotary method for storage, intelligent sorting and picking of express parcels according to an embodiment of the present invention.

In some embodiments of the present invention, an intelligent sorting and picking method performed by using the multi-unit rotary system for storage, intelligent sorting and picking of express parcels, with a method flow chart shown in FIG. 6, comprises the following steps:

Step 1: the system is started.

Step 2: when an express parcel is placed in the input unit, the express parcel is photographed by the visual sensor 1-1 to obtain a side view and a top view of the express parcel, an image edge detection algorithm is used to obtain the size of the express parcel so as to determine the type of the express parcel, the weight of the express parcel is obtained by the pressure sensor 1-3, a segmentation algorithm is used to extract a barcode from the photographed image, thereby obtaining the information of the sent and received express parcel, and when the express parcel passes through the photoelectric sensor 1-4, start time of the express parcel entering the sorting unit 2 is obtained.

In some embodiments of the present invention, an unloading person puts the express parcel into the input unit 1, and the input unit 1 obtains the volume, weight and barcode information of the express parcel, and then communicates with a control system, and when the express parcel is about to enter the sorting unit 2, the photoelectric sensor 1-4 obtains time information of the express parcel entering the sorting unit 2, thereby making preparation for the subsequent sorting operation.

Step 3: according to the type of the express parcel, namely a small parcel, a medium parcel and a large parcel, one of the output openings of the sorting unit 2 corresponding to the parcel is determined; according to the start time of the express parcel entering the sorting unit 2 and a distance between the corresponding one of the output openings of the sorting unit 2 and the input opening of the sorting unit 2, time when the parcel reaches corresponding one of the output openings of the sorting unit 2 is obtained, and when the parcel reaches corresponding one of the output openings of the sorting unit 2, the sorting unit 2 outputs the parcel to the rotary storage unit 3.

In some embodiments of the present invention, the control system determines the information and classifies and identifies the express parcel, and besides, the system controls the start of the conveyor belt drive motor 2-8 and the transverse rubber roller drive motor 2-7, and because information about belt speed and time when the express parcel enters the sorting unit 2 is known, the push hydraulic cylinder 2-6 at a corresponding sorting position is started to sort the express parcel.

Step 4: when the type of the express parcel is determined, the rotary storage unit 3 rotates a rotary storage unit subunit 3-7 to which the parcel belongs to the position of the sorting unit 2, and rotates free storage space of a shelf to which the parcel belongs to corresponding one of the output openings of the sorting unit 2, wherein the shelf is the small parcel storage shelf, the medium parcel storage shelf and the large parcel storage shelf.

Step 4-1: according to the type of the express parcel, the rotating bracket drive motor 3-4 is controlled to drive the rotating bracket 3-2 to rotate so as to drive the rotary storage unit subunit 3-7 to rotate, and the rotary storage unit subunit 3-7 to which the parcel belongs is rotated to the position of the sorting unit 2.

Step 4-2: the system adjusts an extension length of the piston rod of the friction wheel position adjustment servo hydraulic cylinder 3-7-2-2-8 and adjusts the positions of friction wheels 3-7-2-2-5 to upper and lower edges of the shelf to which the parcel belongs.

Step 4-3: the system controls rotation of an output shaft of the friction wheel drive motor 3-7-2-2-1 to drive the friction wheels 3-7-2-2-5 to rotate, thereby driving the free storage space of the shelf to reach the output opening of the sorting unit 2 to which the parcel belongs, and then rotation is stopped.

Step 5: when there is a request for picking up, the rotary storage unit subunit 3-7 where the parcel is located is rotated to the position of the output unit 4, and the storage space of the shelf where the parcel is located is rotated to one of the input openings of the output unit 4, the parcel is then lifted up through the lifting plate 4-1-9 and pushed out by the push plate 4-1-7 to one of the input openings of the spiral conveyor belt 4-2, and the spiral conveyor belt 4-2 conveys the parcel to the client picking unit 4-3, thereby completing the sorting and picking processes of the express parcel.

Step 5-1: when there is a request for picking up, the rotating bracket drive motor 3-4 is controlled to drive the rotating bracket 3-2 to rotate, and the rotary storage unit subunit 3-7 is then driven to rotate so that the rotary storage unit subunit 3-7 where the parcel is located is rotated to the position of the output unit 4.

In some embodiments of the present invention, the control system sends a mail or short message containing a picking code or a barcode of picking information to the client, and notifies the client to pick the express parcel; the client inputs the picking code or provides the barcode at the client picking unit 4-3, and the client picking unit 4-3 immediately communicates with the control system; the control system analyses the received information and finds the storage information of the express parcel to be picked.

Step 5-2: the system adjusts an extension length of the piston rod of the friction wheel position adjustment servo hydraulic cylinder 3-7-2-2-8 and adjusts the positions of friction wheels 3-7-2-2-5 to the upper and lower edges of the shelf to which the parcel belongs.

Step 5-3: the system controls an output shaft of the friction wheel drive motor 3-7-2-2-1 to rotate, and the friction wheels 3-7-2-2-5 are then driven to rotate to further drive the storage space of the shelf where the parcel is located to rotate to one of the input openings of the output unit 4.

Step 5-4: the system controls an output shaft of the ball screw drive motor 4-1-2 to rotate, and ball screws 4-1-3 are then driven to rotate to further drive the lifting plate 4-1-9 on the support base 4-1-11 to reach a gap in a lower end of the shelf to which the parcel belongs.

Step 5-5: the system controls the piston rod of the lifting plate telescopic hydraulic cylinder 4-1-12 to extend out, and the lifting plate 4-1-9 is then driven to extend into the gap in the lower end of the shelf.

Step 5-6: the system controls the output shaft of the ball screw drive motor 4-1-2 to rotate, and the ball screws 4-1-3 are then driven to rotate to further drive the lifting plate 4-1-9 on the support base 4-1-11 to rise, thereby lifting the parcel up.

Step 5-7: the system controls the piston rod of the push plate telescopic hydraulic cylinder 4-1-6 to extend out, and the push plate 4-1-7 is then driven to move forward to push out the parcel from the lifting plate 4-1-9 to one of the input openings of the spiral conveyor belt 4-2.

Step 5-8: the spiral conveyor belt 4-2 then conveys the parcel to the client picking unit 4-3.

In some embodiment of the present invention, the control system controls the express parcel picking mechanical arm to reset to make preparation for the subsequent parcel picking; and the control system controls the spiral conveyor drive motor (not shown) to start to convey the express parcel to a delivery opening of the client picking unit 4-3, thereby completing a picking process.

The specific embodiments of the present invention have been described in detail above, and are merely exemplary, and the present invention is not limited to the specific examples described above. For those skilled in the art, any equivalent modifications and substitutions of the present invention are also within the scope of the present invention. Accordingly, all equivalent changes and modifications, made without departing from the spirit and scope of the present invention, shall fall within the scope of the present invention.

What is claimed is:

1. A multi-unit rotary system for storage, intelligent sorting and picking of express parcels, comprising: an input unit, a sorting unit, a rotary storage unit and an output unit, wherein an output opening of the input unit is connected with an input opening of the sorting unit, and a plurality of output openings of the sorting unit are respectively connected with different storage units of the rotary storage unit, and the different storage units of the rotary storage unit are connected with input openings of the output unit;

wherein the rotary storage unit comprises an outer-layer annular guide rail, a rotating bracket, an inner-layer annular rail, a rotating bracket drive motor, a speed reducer, a drive shaft, and a plurality of rotary storage unit subunits;

wherein the outer-layer annular guide rail, the rotating bracket and the inner-layer annular rail are sequentially arranged on the ground from the outside to the inside, inner lower edges of the rotary storage unit subunits are connected with the inner-layer annular rail, outer lower edges of the rotary storage unit subunits are connected with the outer-layer annular guide rail, and middle positions of lower ends of the rotary storage unit subunits are fixedly connected with an upper end of the rotating bracket; the rotating bracket drive motor is arranged on the ground, the speed reducer is connected to an output shaft of the rotating bracket drive motor, and the speed reducer drives the rotating bracket to rotate through the drive shaft of the rotary storage unit;

wherein each rotary storage unit subunit comprises a rotary storage subunit shelf portion and a rotary storage subunit base portion;

wherein the rotary storage subunit shelf portion comprises a small parcel storage shelf, a medium parcel storage shelf, a large parcel storage shelf and universal ball bearings; the small parcel storage shelf, the medium parcel storage shelf and the large parcel storage shelf are stacked in a vertical direction, and every two of the small parcel storage shelf, the medium parcel storage shelf and the large parcel storage shelf are connected by the universal ball bearing and one of the small parcel storage shelf, the medium parcel storage shelf and the large parcel storage shelf and a bottom plate are connected by the universal ball bearing; and wherein the rotary storage subunit base portion comprises an express parcel baffle, a friction wheel driving device and the bottom plate, wherein the express parcel baffle is fixed to an upper end of the bottom plate and located on an inner side of the rotary storage subunit shelf portion; and the friction wheel driving device is fixed to the upper end of the bottom plate, and is in contact with the rotary storage subunit shelf portion.

2. The multi-unit rotary system according to claim 1, wherein the friction wheel driving device comprises a friction wheel drive motor, a coupling, a bevel gear drive speed reducer, a sliding coupling sleeve, friction wheels, axial retaining rings, a plain bearing, a friction wheel position adjustment servo hydraulic cylinder, a first fixing frame, a second fixing frame, a fixing shaft and a drive shaft;

wherein the friction wheel drive motor is connected with the bevel gear drive speed reducer through the coupling, the bevel gear drive speed reducer is fixed to one side of the first fixing frame, and the first fixing frame is fixedly arranged at the upper end of the bottom plate, the bevel gear drive speed reducer is connected with the drive shaft of the friction wheel driving device through the sliding coupling sleeve, the drive shaft of the friction wheel driving device is connected with the friction wheel position adjustment servo hydraulic cylinder through the plain bearing, and the friction wheel position adjustment servo hydraulic cylinder is fixedly arranged on one side of the second fixing frame; one end of the fixing shaft is fixed to the other side of the first fixing frame, and the other end of the fixing shaft is fixed to the other side of the second fixing frame; and two friction wheels respectively sleeve the drive shaft of the friction wheel driving device and the fixing shaft, and are axially fixed on the drive shaft of the friction wheel driving device and the fixing shaft through the axial retaining rings, and the friction wheel on the drive shaft of the friction wheel driving device and the drive shaft of the friction wheel driving device are located in a circumferential direction in a key connection manner.

3. The multi-unit rotary system according to claim 1, wherein the output unit comprises an output unit mechanical arm, a spiral conveyor belt and a client picking unit, wherein the output unit mechanical arm is connected with multiple layers of input openings of the spiral conveyor belt, and an output opening of the spiral conveyor belt is connected with the client picking unit;

wherein the output unit mechanical arm comprises a first bracket, a ball screw drive motor, ball screws, nuts, connecting rods, a push plate telescopic hydraulic cylinder, a push plate, a stand column with balls, a lifting plate, a second bracket, a support base and a lifting plate telescopic hydraulic cylinder, wherein the ball screw drive motor is fixedly arranged at an upper end of the first bracket, and an output shaft of the ball screw drive motor is connected with one end of each ball screw through a transmission device, the other end of each ball screw is fixedly connected with the second bracket, and the second bracket is fixedly arranged at one of the input openings of the spiral conveyor belt; and one end of the connecting rods are connected with the ball screws through the nuts, the other end of the connecting rods are connected with the support base, the push plate telescopic hydraulic cylinder and the lifting plate telescopic hydraulic cylinder are fixedly arranged at an upper end of the support base, the push plate is arranged at one end of a piston rod of the push plate telescopic hydraulic cylinder, the lifting plate is arranged at one end of a piston rod of the lifting plate telescopic hydraulic cylinder, and the stand column with balls is arranged at an upper end of the lifting plate.

4. The multi-unit rotary system according to claim 3, wherein gaps matched for use with the lifting plate are arranged between inner sides of every two of the small parcel storage shelf, the medium parcel storage shelf and the large parcel storage shelf and between the inner side of large-sized parcel storage shelf and an inner side of the bottom plate, respectively.

5. The multi-unit rotary system according to claim 1, wherein the express parcel baffle is located in an outlet direction of the sorting unit.

6. The multi-unit rotary system according to claim 1, wherein the input unit is provided with a visual sensor, a conveyor belt drive motor, a pressure sensor, a photoelectric sensor and a conveyor belt.

7. The multi-unit rotary system according to claim 3, wherein two ball screws are arranged, four nuts are arranged, four connecting rods are arranged, and the two ball screws are arranged in parallel.

8. An intelligent sorting and picking method performed by using the multi-unit rotary system for storage, intelligent sorting and picking of express parcels according to claim 1, comprising the following steps:

step 1: the system is started;

step 2: when an express parcel is placed in the input unit, the express parcel is photographed by a visual sensor to obtain a side view and a top view of the express parcel, an image edge detection algorithm is used to obtain the size of the express parcel so as to determine the type of the express parcel, the weight of the express parcel is obtained by a pressure sensor, a segmentation algorithm is used to extract a barcode from the photographed image, thereby obtaining the information of the sent and received express parcel, and when the express parcel passes through a photoelectric sensor, start time of the express parcel entering the sorting unit is obtained;

step 3: according to the type of the express parcel, namely a small parcel, a medium parcel and a large parcel, one of the output openings of the sorting unit corresponding to the parcel is determined; according to the start time of the express parcel entering the sorting unit and a distance between the corresponding one of the output openings of the sorting unit and the input opening of the sorting unit, time when the parcel reaches corresponding one of the output openings of the sorting unit is obtained; and when the parcel reaches corresponding one of the output openings of the sorting unit, the sorting unit outputs the parcel to the rotary storage unit;

step 4: when the type of the express parcel is determined, the rotary storage unit rotates a rotary storage unit subunit to which the parcel belongs to the position of the sorting unit, and rotates free storage space of a shelf to which the parcel belongs to corresponding one of the output openings of the sorting unit, wherein the shelf is the small parcel storage shelf, the medium parcel storage shelf and the large parcel storage shelf; and step 5: when there is a request for picking up, the rotary storage unit subunit where the parcel is located is rotated to the position of the output unit, and the storage space of the shelf where the parcel is located is rotated to one of the input openings of the output unit, the parcel is then lifted up through a lifting plate and pushed out by a push plate to one of input openings of a spiral conveyor belt, and the spiral conveyor belt conveys the parcel to a client picking unit, thereby completing the sorting and picking processes of the express parcel.

9. The intelligent sorting and picking method according to claim 8, wherein step 4 that when the type of the express parcel is determined, the rotary storage unit rotates the shelf to which the parcel belongs to the position of the sorting unit, and rotates the free storage space of the shelf to which the parcel belongs to corresponding one of the output openings of the sorting unit, specially comprises the following steps:

step 4-1: according to the type of the express parcel, the rotating bracket drive motor is controlled to drive the rotating bracket to rotate so as to drive the rotary storage unit subunit to rotate, and the rotary storage unit subunit to which the parcel belongs is rotated to the position of the sorting unit;

step 4-2: the system adjusts an extension length of a piston rod of a friction wheel position adjustment servo hydraulic cylinder and adjusts the positions of friction wheels to upper and lower edges of the shelf to which the parcel belongs; and step 4-3: the system controls rotation of an output shaft of a friction wheel drive motor to drive the friction wheels to rotate, thereby driving the free storage space of the shelf to reach the output opening of the sorting unit to which the parcel belongs, and then rotation is stopped.

10. The intelligent sorting and picking method according to claim 8, wherein step 5 that when there is a request for picking up, the rotary storage unit subunit to which the parcel belongs is rotated to the position of the output unit, and the storage space of the shelf where the parcel is located is rotated to one of the input openings of the output unit, the parcel is then lifted up through the lifting plate and pushed out by the push plate to one of the input openings of the spiral conveyor belt, and the spiral conveyor belt conveys the parcel to the client picking unit, thereby completing the sorting and picking processes of the express parcel, specially comprises the following steps:

step 5-1: when there is a request for picking up, the rotating bracket drive motor is controlled to drive the rotating bracket to rotate, and the rotary storage unit subunit is then driven to rotate so that the rotary storage unit subunit where the parcel is located is rotated to the position of the output unit;

step 5-2: the system adjusts an extension length of a piston rod of a friction wheel position adjustment servo hydraulic cylinder and adjusts the positions of friction wheels to upper and lower edges of the shelf to which the parcel belongs;

step 5-3: the system controls an output shaft of the friction wheel drive motor to rotate, and the friction wheels are then driven to rotate to further drive the storage space of the shelf where the parcel is located to rotate to one of the input openings of the output unit;

step 5-4: the system controls an output shaft of a ball screw drive motor to rotate, and ball screws are then driven to rotate to further drive the lifting plate on a support base to reach a gap in a lower end of the shelf to which the parcel belongs;

step 5-5: the system controls a piston rod of a lifting plate telescopic hydraulic cylinder to extend out, and the lifting plate is then driven to extend into the gap in the lower end of the shelf;

step 5-6: the system controls the output shaft of the ball screw drive motor to rotate, and the ball screws are then driven to rotate to further drive the lifting plate on the support base to rise, thereby lifting the parcel up;

step 5-7: the system controls a piston rod of a push plate telescopic hydraulic cylinder to extend out, and the push plate is then driven to move forward to push out the parcel from the lifting plate to one of the input openings of the spiral conveyor belt; and step 5-8: the spiral conveyor belt then conveys the parcel to the client picking unit.

* * * * *